US009443242B2

(12) United States Patent
Chu et al.

(10) Patent No.: US 9,443,242 B2
(45) Date of Patent: Sep. 13, 2016

(54) METHOD FOR UPDATING ADVERTISEMENT CONTENT USING DRM

(75) Inventors: Younsung Chu, Anyang-si (KR); Gak Yang, Anyang-si (KR); Youngseob Son, Seoul (KR); Dukehee Lee, Gunpo-Si (KR)

(73) Assignee: LG ELECTRONICS INC., Seoul (KR)

( * ) Notice: Subject to any disclaimer, the term of this patent is extended or adjusted under 35 U.S.C. 154(b) by 503 days.

(21) Appl. No.: 13/639,699

(22) PCT Filed: Apr. 5, 2011

(86) PCT No.: PCT/KR2011/002381
§ 371 (c)(1),
(2), (4) Date: Oct. 5, 2012

(87) PCT Pub. No.: WO2011/126280
PCT Pub. Date: Oct. 13, 2011

(65) Prior Publication Data
US 2013/0030912 A1   Jan. 31, 2013

Related U.S. Application Data

(60) Provisional application No. 61/321,122, filed on Apr. 5, 2010, provisional application No. 61/326,646, filed on Apr. 21, 2010, provisional application No. 61/379,388, filed on Sep. 2, 2010.

(51) Int. Cl.
*G06Q 30/00* (2012.01)
*G06F 21/10* (2013.01)
(Continued)

(52) U.S. Cl.
CPC .............. *G06Q 30/00* (2013.01); *G06F 21/10* (2013.01); *H04L 63/10* (2013.01); *H04L 67/06* (2013.01);
(Continued)

(58) Field of Classification Search
CPC .. G06Q 30/00; G06Q 30/02; G06Q 20/1235; G06F 21/10; G06F 2221/2141; H04L 63/10; H04L 67/06; H04L 2463/101

USPC .................................................. 705/14, 901
See application file for complete search history.

(56) References Cited

U.S. PATENT DOCUMENTS 6,912,571 B1 * 6/2005 Serena .......................... 709/224
8,667,525 B2 * 3/2014 Candelore ...................... 725/32
(Continued)

FOREIGN PATENT DOCUMENTS

CN         101095136        12/2007
CN         101184086         5/2008
(Continued)

OTHER PUBLICATIONS

The State Intellectual Property Office of the People's Republic of China Application Serial No. 201180017845.6, Office Action dated Aug. 5, 2014, 7 pages.

*Primary Examiner* — Bennett Sigmond
*Assistant Examiner* — Christopher Stroud
(74) *Attorney, Agent, or Firm* — Lee Hong Degerman Kang & Waimey; Jonathan Kang; Jeffrey Lotspeich

(57) ABSTRACT

The present invention relates to a content update method, comprising the steps of: receiving, by a terminal, a specific-formatted data from a server, the specific-formatted data including a container and a variable information box, wherein the container includes a header, the variable information box includes a new advertisement content, the header includes a field which contains information on first advertisement content, and the field indicates that the new advertisement content is used for updating the first advertisement content; checking whether the terminal includes information matched with the information on the first advertisement content, wherein the first advertisement content is included in the specific-formatted data together with a non-advertisement content; and if a matching information is found as a result of the check, replacing the first advertisement content within the specific formatted data with the new advertisement content.

4 Claims, 12 Drawing Sheets

(51) Int. Cl.
  *H04L 29/06*  (2006.01)
  *H04L 29/08*  (2006.01)
  *G06Q 30/02*  (2012.01)
  *G06Q 20/12*  (2012.01)
(52) U.S. Cl.
  CPC ... *G06F 2221/2141* (2013.01); *G06Q 20/1235* (2013.01); *G06Q 30/02* (2013.01); *H04L 2463/101* (2013.01)

(56) References Cited

U.S. PATENT DOCUMENTS

2006/0117391 A1* 6/2006 Kim ............................... 726/27
2007/0271455 A1* 11/2007 Nakano ............. G06Q 20/1235
                                                    713/154
2010/0198687 A1* 8/2010 Bang et al. ................ 705/14.53

FOREIGN PATENT DOCUMENTS

| | | |
|---|---|---|
| CN | 101296359 | 10/2008 |
| CN | 101637005 | 1/2010 |
| CN | 101835148 | 9/2010 |
| KR | 10-2006-0040489 | 5/2006 |
| KR | 10-2008-0027040 | 3/2008 |
| KR | 10-2009-0000133 | 1/2009 |
| KR | 10-2009-0000144 | 1/2009 |
| KR | 10-2009-0010468 | 1/2009 |

* cited by examiner

METHOD FOR UPDATING ADVERTISEMENT CONTENT USING DRM

CROSS-REFERENCE TO RELATED APPLICATIONS

This application is the National Stage filing under 35 U.S.C. 371 of International Application No. PCT/KR2011/002381, filed on Apr. 5, 2011, which claims the benefit of U.S. Provisional Application Ser. No. 61/321,122, filed on Apr. 5, 2010, U.S. Provisional Application Ser. No. 61/326,646, filed on Apr. 21, 2010, and U.S. Provisional Application Ser. No. 61/379,388, filed on Sep. 2, 2010, the contents of which are all hereby incorporated by reference herein in their entirety.

TECHNICAL FIELD

The present invention relates to digital rights management (DRM).

BACKGROUND ART

Digital rights management (DRM) is a system technology for protecting and systematically managing rights of a digital content, and provides prevention of illegal duplication of a content, acquisition of a DRM content and a rights object (RO), creation and distribution of a DRM content, a series of protection and management systems on use rights, etc.

FIG. 1 illustrates a configuration of a general DRM system. A DRM system may include a terminal 1, a rights issuer (RI) 2, and a contents issuer (CI) 3. The general DRM system controls a digital content which a content provider has transmitted to a user, so that the content is used only by as many as use rights granted to the user. Here, the content provider is an entity corresponding to the content issuer 3 and/or the rights issuer 2.

The content issuer (CI) 3 issues a protected content (hereinafter, referred to as "DRM content") using a specific encryption key so that the content is protected from an access of an unauthorized user, and the rights issuer (RI) 2 issues a rights object (RO) related with the DRM content to a user. the user of a terminal 1 having the DRM content and the rights object may use the DRM content.

On the other hand, such a DRM system may be used as a system for distributing an advertisement content to a terminal by an advertisement provider, and consuming, updating and managing the distributed advertisement content. In particular, the DRM system may control each entity so that advertisement content may be consumed, updated and managed in conjunction with a general content, which is not an advertisement content, that is, a non-advertisement content.

DISCLOSURE

Technical Problem

An object of the present invention devised to solve the problem lies in a method for forcibly making a user consume an advertisement content before consuming a non-advertisement content. Another object of the present invention devised to solve the problem lies in a method for updating an advertisement content without changing a rights object connected with a non-advertisement content.

Another object of the present invention devised to solve the problem lies in a method for setting a rights object such that an advantage may be given with respect to permission for a use of a general content based on consumption of an advertisement content.

Technical Solution

The object of the present invention may be achieved by providing a content update method, including receiving, by a terminal, a specific-formatted data from a server, the specific-formatted data including a container and a mutable information box, wherein the container includes a header, the mutable information box includes a new advertisement content, the header includes a field which contains information on a first advertisement content, and the field indicates that the new advertisement content is used for updating the first advertisement content, checking, by the terminal, whether there is information which matches with information on the first advertisement content, wherein the first advertisement content is included in the specific-formatted data along with a non-advertisement content, and if a matching information is found as a result of the check, replacing the first advertisement content in the specific-formatted data with the new advertisement content, wherein the first advertisement content and the new advertisement content are able to be consumed based on one rights object, wherein the one rights object includes a constraint which enforces at least one of the first advertisement content and the new advertisement content to be consumed before the non-advertisement content is consumed.

The above embodiment and other embodiments may include one or more of the following features.

The specific-formatted data may be a digital rights management (DRM) content format. The field may be an old content identifier (ID) field. The first advertisement content and the new advertisement content may be decrypted based on a content encryption key in the one rights object. The rights object may include at least one of a playout constraint and a displayout constraint.

The content update method may further include transmitting a rights object request message by the terminal, wherein the rights object request message includes impression data on consumption of the new advertisement content or the first advertisement content, and receiving by the terminal a rights object response message including a rights object for the non-advertisement content.

Advantageous Effects

According to an advertisement content update method disclosed in the present specification, an advertisement provider may update an advertisement content directly or according to a terminal request. Further, according to the advertisement content update method, a DRM agent may consume a non-advertisement content in conjunction with an advertisement content.

According to the advertisement content update method, even if only one rights object is issued to use a general DRM content, the advertisement content may be continually updated therethrough, and even if the advertisement content is continually updated, the DRM agent does not need to be issued the rights object for the general DRM content.

According to the advertisement content update method, a DRM agent may set a rights object such that an advantage may be given with respect to permission on a use of a general content based on a consumption of an advertisement content.

MODE FOR INVENTION

Figure 1:
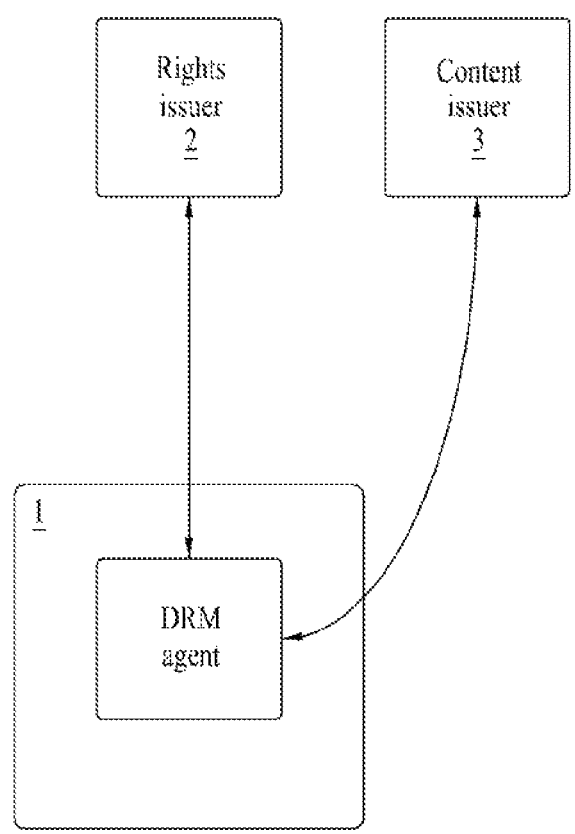
FIG. 1 is a view illustrating a configuration of a general DRM system.

The technology disclosed in the present specification is applied to a digital rights management system. However, the present invention is not limited to thereto, and may be applied to all communication systems and methods, and other systems and methods for protecting digital content to which the technical concept of the above technical may be applied.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure belongs, and should not be construed in an excessively comprehensive manner or an extremely restricted manner. For example, the detailed description below is specifically described assuming that the terminal is a DRM system stipulated in Open Mobile Alliance (OMA), but the present invention may be applied to any other arbitrary digital content protection system except peculiar matters of OMA DRM.

In addition, if a technical term used in the description of the present disclosure is an erroneous term that fails to clearly express the idea of the present disclosure, it should be replaced by a technical term that may be properly understood by those skilled in the art. In addition, general terms used in the description of the present disclosure should be construed according to definitions in dictionaries or according to context, and should not be construed in an excessively restrained manner.

A singular representation may include a plural representation unless the context clearly indicates otherwise. It will be understood that the terms 'comprise', 'include', etc., when used in this specification, specify the presence of several components or several steps and part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element may be directly connected with the other element or intervening elements may also be present. In contrast, when an element is referred to as being "directly connected with" another element, there are no intervening elements present.

Further, a terminal may be referred to as a user equipment (UE), a device, a mobile equipment (ME), and a mobile station (MS). Further, the terminal may be a portable device having a communication function, such as a mobile phone, a PDA, a smartphone, a notebook computer, etc.

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention.

The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

DRM System and Management of Advertisement Content

Figure 2:
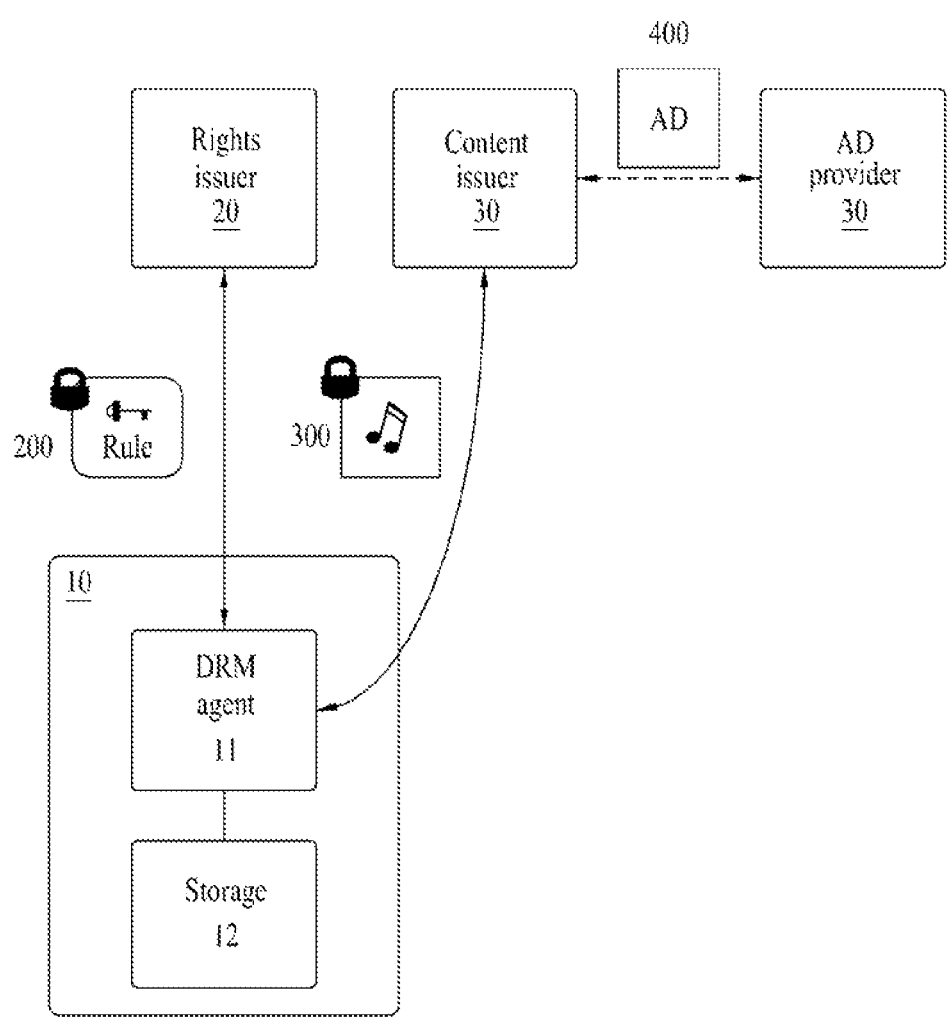
FIG. 2 is a view illustrating a configuration of a DRM system for providing an advertisement content.

FIG. 2 is a view illustrating a DRM system for providing an advertisement content according to embodiments of the present invention.

Referring to FIG. 2, the DRM system may include a rights issuer (RI) 20, a content issuer (CI) 30 and an advertisement provider 30'.

The terminal 10 includes a DRM agent 11. The DRM agent 11, which is an entity existing within the terminal 10, receives a DRM content 300 from the content issuer 30, receives a rights object 200 related with the DRM content 300 from the rights issuer 20, and manages the received DRM content, rights object 200, permissions and constraints, etc. The permissions refer to use methods authorized by the rights issuer for the DRM content 300, and the constraints refer to conditions that specifically limit permissions for the DRM content 300.

The DRM content 300 is a protected form of a digital work which is usable according to permissions and constraints included in the use right. Some examples of a digital work protected by the DRM content are ring tones, a screen saver, a background screen, a game, advertisement content and a combination thereof. The DRM content 300 is transmitted to the DRM agent 11 in the form of a DRM content format (DCF). The DCF will be described with reference to FIG. 3.

The terminal 10 may include a trusted storage 12 where an unauthorized access from an outside is prohibited.

The trusted storage 12 may be implemented using tamper-resistant hardware or software. The trusted storage 12 blocks an access from an unauthorized entity other than the DRM agent 11, and thus the DRM agent 11 may store information, which requires confidentiality and integrity on management and storage, in the trusted storage 12. However, when storing the DCF in the trusted storage 12, only part other than part, which has already been encrypted and is protected as DRM content, may be stored and managed.

The DRM system may use a public key infrastructure (PKI). The entities within such a DRM system have a public key (PuK) and a private key (PrK) which form a cryptographic pair. The public key and the private key may be certified by a certification authority (CA) (not shown).

The DRM system may use a public key infrastructure (PKI). The entities within such a DRM system has a public key (PuK) and a private key (PrK) which cryptographically form a pair. The public key and the private key may be certified by a certification authority (CA) (not shown).

The Rights object includes an REK which has been encrypted by the rights issuer (RI) 20 using the public key of the DRM agent 11.

The DRM agent 11 has a public key and a private key of a terminal. Hence, the DRM agent 11 may decrypt the encrypted REK within the rights object using the private key of the terminal. The DRM agent 11 obtains main information within the rights object using the REK, and analyzes permissions and/or constraints included in the rights object, thereby controlling use of the DRM content in the terminal 10.

For example, in case a first DRM content, which is received from the content issuer (CI) 30, is stored in the terminal 10, the DRM agent 11 requests a first DRM rights object to the rights issuer 20 in order to use the first DRM content. In response to the request, the rights issuer 20 issues the first rights object related with the first DRM content. The DRM agent 31 may decrypt the first DRM content using an encryption key within the rights object, and the first DRM content is consumed according to permissions and/or constraints included in the first rights object.

Further, in the embodiments disclosed in the present specification, advertisement content 400, which is a form of a digital content, is protected in the form of a DRM content, and may be transmitted to the terminal and then consumed. The advertisement content 400 refers to a media object of a promotional nature such as a TV commercial, and may be considered the same as a general media object explained in the present specification. That is, the advertisement content 400 is also consumed according to a set of permissions stipulated substantially within the rights object, and is expressed as a DRM content.

To this end, the advertisement provider 30' may transmit the advertisement content 400 to the content issuer 30, and the terminal 10 may receive the advertisement content 400 transmitted from the content issuer 30.

The advertisement content 400 tends to be consumed in conjunction with consumption of the DRM content 300, not for advertisement, due to the characteristics of content provided for publicity. Enforced advertising refers to a consumption method of an advertisement content forcibly rendered according to the rule included in the rights object or the DCF.

Further, the present specification discloses a method of updating the advertisement content 400 separately from the DRM content. Further, the present specification discloses a method of obtaining a rights object whose permissions and/or constraints for the DRM content 300 have been determined.

Concerning DCF (DRM Content Format)

Figure 3:
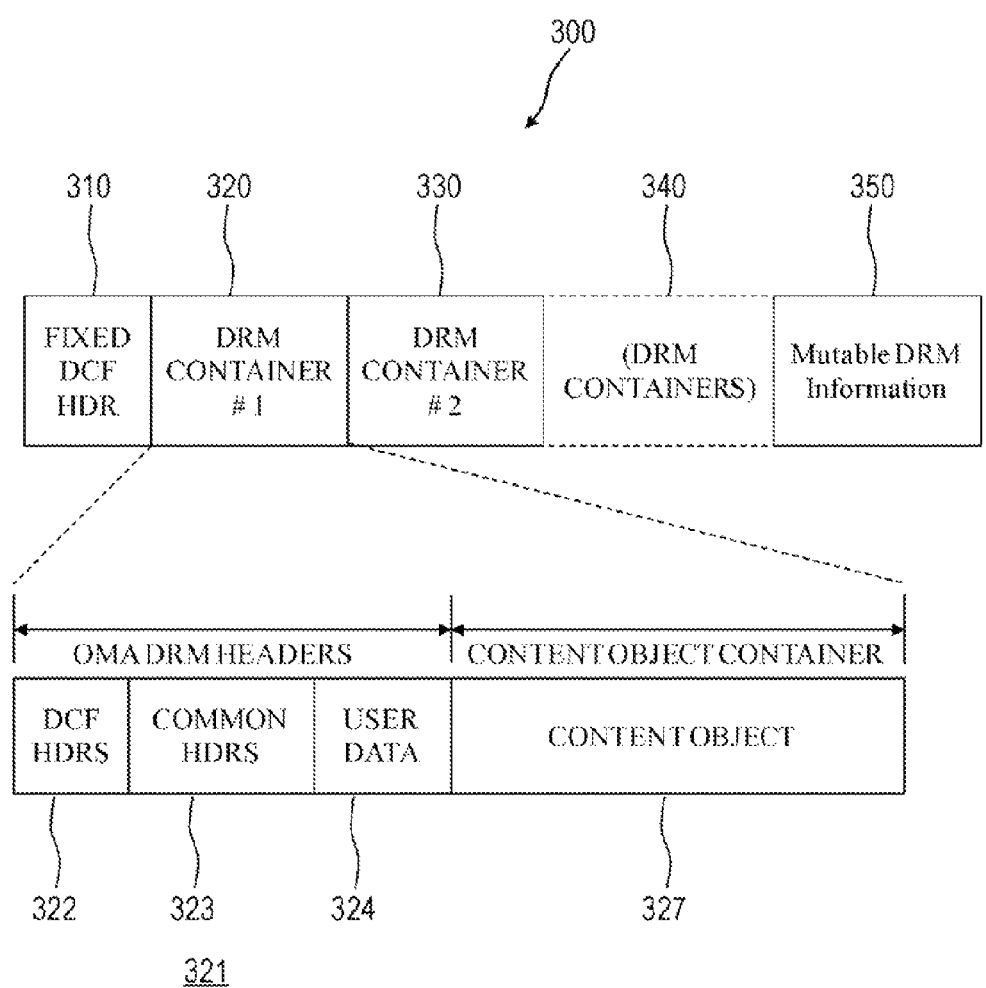
FIG. 3 is a view illustrating an example of a DCF used in a DRM system.

Hereinafter, the DCF structure of a DRM system is disclosed. FIG. 3 is a view illustrating an example of a DCF used in embodiments of the present invention.

A DCF 300 is a form of data used when a content issuer 30 issues DRM content, or a DRM agent 11 receives and manages the issued DRM content. The DRM agent 11 receives the DCF 300 from the content issuer 30 and analyzes the received DCF 300 in line with the DCF format, and manages the DCF 300 so that the digital content included in the DCF 300 may be consumed.

DCF format may have different structures according to the feature of the DRM content. For example, The DCF format may be divided into a continuous media profile for a streaming content, and a discrete media profile for a downloaded content.

The discrete media profile may be a media file format according to the rule of ISO 14496-12. The technology disclosed in the present specification is illustrated using a DCF according to discrete media, but the technical concept about the protection and management of a DRM content is not limited to thereto, and may also be applied to a continuous media profile and other DCF formats. Hereinafter, a DCF is for downloaded and consumed DRM content, and represents a format that follows an ISO-based discrete media profile.

Referring to FIG. 3, a DCF 300 may include a fixed DCF header 310, one or more DRM containers 320, 330 and 340, etc., and a mutable DRM information box 350.

The fixed DCF header 210 represents file type information stipulated in the ISO-based media file format, and thus may be configured to represent the brand version information of the DCF 300. For example, the fixed DCF header 310 may include brand information "odcf" and version information "2" in order to indicate a DCF format of OMA DRM 2.x.

One or more DRM containers 320, 330, 340, etc. may include a DRM content and header information. The first DRM container 320, which is followed by the fixed DCF header 310, will be described below. The first DRM container 320 may include an OMA DRM header 321 and a content object 327. The OMA DRM header 321 may include a DCF header 322, a common header 323 and a user data box 324.

The DCF header 322 refers to a DCF header for the DRM container 320. The DCF header 322 includes brand information for the DRM container 320, etc.

The common header 323 contains information about the content object 327 included in the DRM container 320 (specifically, information about DRM content within the content object 327). Information included in the common header 323 is shown in Table 1 below.

TABLE 1

| Field | Description |
|---|---|
| Version | Common Headers Version |
| EncryptionMethod | Encryption method |
| PaddingScheme | Padding type |
| PlaintextLength | Plaintext content length in bytes |
| ContentIDLength | Length of ContentID field in bytes |
| RightsIssuerURLLength | Rights Issuer URL field length in bytes |
| TextHeadersLength | Length of the TextHeaders array in bytes |
| ContentID | Content ID string |
| RightsIssuerURL | Rights Issuer URL string |
| TextHeaders | Additional headers as Name: Value pairs |
| ExtendedHeaders | Extended headers boxes |

Version field represents a version of a standard document which stipulates the DCF format. EncryptionMethod field indicates an algorithm used to encrypt DRM content within the content object 327 and, for example, may represent an encryption method of an AES block encryption algorithm. PaddingScheme field represents a method in which the last block is padded while using a block encryption algorithm. PlaintextLength field represents the length of digital content before encryption. ContentIDLength field represents the length of ContentID field, RightsIssuerURLLength field represents the length of RightsIssuerURL field, and TextHeadersLength field represents the length of TextHeaders field.

TextHeaders field indicates additional information of the digital content through a pair format of "name: value". TextHeaders field may include additional information such as Silent header, Preview header, ContentURL header, ContentVersion header, Content-Location header, ProfileName header, etc.

ExtendedHeaders field includes extension information about the digital content. In case the digital content corresponds to part of a specific content group, ExtendedHeaders field may include GroupID information which indicates the identifier of the specific content group.

Further, ExtendedHeaders field may include OldContentID field which is used in part of the embodiments disclosed in the present specification. OldContentID field represents the identifier of advertisement content to be updated, and will be described later along with embodiments.

The content object 327 includes an encrypted digital content, i.e., a DRM content. The DRM content has been encrypted by the content issuer CI 30 using an algorithm indicated by EncryptionMethod field of the common header 323. Thereafter, the DRM agent 11 acquires a rights object related with the DRM with reference to ContentID included in the common header 323, acquires an encryption key for the DRM content from the related rights object, and decrypts the DRM content using the encryption key.

Further, the advertisement content used in the embodiments of the present specification may be included in the content object 327. In the embodiments of the present specification, the DRM agent 11 is related with a method of updating the existing advertisement content using the advertisement content included in the content object 327. The advertisement content update method will be described later.

The mutable DRM information box 350 contains information which is editable by the terminal 10. Some examples of data, which may be included in the mutable DRM information box 350, are a transaction tracking box, a rights object box, a user-data box and a ContentID sub-box.

The mutable DRM information box 350 is disregarded in the DCF hash calculation process. In order to protect the integrity of the DCF, the DCF hash may be included as a field within the rights object related with the DRM content, or as a parameter within the protocol in the DCF hash calculation process. However, since the mutable DRM information box 350 is disregarded in the process of calculating a DCF hash, the integrity of the mutable DRM information box 350 is not protected.

The DRM information box 350 may not be included in a streamable PDCF (Packetized DCF). One mutable DRM information box 350 is used for each DCF.

Further, the present specification discloses embodiments where an advertisement content is included in the mutable DRM information box. At this time, the advertisement content may be included in user data information within the mutable DRM information box 350.

Further, a multipart DCF refers to a DCF including a plurality of DRM containers. That is, in case the DCF 300 includes a second DRM container 330 or more DRM containers 340 in addition to the first DRM container 320, the DCF 300 is a multipart DCF. In the case of a multipart DCF, the media types of digital content included in each DRM content may be different from each other.

In this case, each DRM container may have the same structure as that of the first DRM container 320. Hence, ContentID of digital content, which is included in the content object of each DRM container, is included in the common header of each DRM container. Further, the DRM agent 11 is related with digital content included in one multipart DCF.

Further, each DRM container of the multipart DCF may include an advertisement content.

Rights Object (RO)

Hereinafter, the structure of a rights object of a DRM system is described.

The rights object refers to data including permissions and constraints given by a rights issuer (RI) 20 with respect to a use of DRM content, and identification information about related DRM content. The permissions about the DRM content refer to methods permitted by the rights issuer 20 so that the DRM agent 11 may consume the DRM content. Further, the constraints about the DRM content refer to conditions that specifically limit methods of using the DRM content according to the permissions.

The rights object (RO) may be transmitted or stored in the form of a rights object container. The rights object container may be expressed according to document encoding rules in machine readable form.

In particular, the rights object container may be expressed by a rights expression language (REL), and some examples of the REL are an extensible markup language (XML) and an open digital rights language (ODRL). Particularly, the rights object may be expressed by an REL which follows a mobile profile of ODRL v1.1.

Further, each of the rights items included in the rights object may be expressed using elements of REL. The rights items within the rights object may be classified by the functions thereof. Table 2 describes models by functions of elements which may be included in the rights object used in the embodiments disclosed in the present specification.

TABLE 2

| Foundation Model | Basic elements of rights items. |
|---|---|

TABLE 2-continued

| | |
|---|---|
| Agreement Model | Elements that express rights items permitted for DRM content corresponding to an asset. |
| Context Model | Elements that express meta information for items. They are extended by displaying additional information for the foundation model, the agreement model and the constraint model. |
| Permission Model | Elements that specifically express rights items permitted for a DRM content. It specifically controls consumption of a DRM content along with Constraint Model. |
| Constraint Model | Elements that specifically control consumption of DRM content in conjunction with one permission element. |
| Requirements Model | Elements that indicate prerequisites which should first be settled to obtain related permissions. |
| Inheritance Model | Elements that express permissions and constraints inherited from parent rights objects. |
| Security Model | Elements that provide confidentiality of CEK, integrity about correlation between rights objects, integrity of rights objects, authentication, etc. |

Foundation model includes <rights> elements corresponding to the uppermost element of the rights objects. The foundation model plays a role of a starting point for combining the agreement model and the context model on the lower side.

The context model includes <version> and <uid> elements. The elements of the context model are included in <rights> element, <asset> element, <individual> element, <system> element, <inherit> element, etc., and display meta information for each element. In particular, <context> element, which is included in the lower element of the <rights> element, may include identification information of the rights object.

The agreement model includes elements displaying identification information on a DRM content, and elements displaying permissions and constraints related with the DRM content. The agreement model may be specifically expressed using a permission model and a constraint model. That is, a method of consuming the DRM content using elements corresponding to the permission model and the elements corresponding to the constraint model, and constraints are stipulated.

For example, a rights object may include a <rights> element, and the <rights> element may include <context> element and <agreement> element. Here, the <context> element may include identification information of the rights object, and the <agreement> element may include <asset> element including information about DRM content related with the rights object, and <permission> element including permissions on the related DRM content.

Permissions, which may be expressed by the rights objects, include <play>, <display>, <execute>, <print>, <export> and <access> elements.

The elements corresponding to the requirement model include <tracked>, <access-code>, <AdvertisementPolicy>, <playout>, <displayout>, <executeout>, <enforcement-duration>, <enforcement-count>, etc. The elements included in the requirement model indicate specific prerequisites which should first be settled to obtain related permissions.

For example, if <permission> element includes the element of the requirement model, the DRM agent 11 may obtain permissions expressed by the <permission> after consuming a specific advertisement content which is referred to by the element of the requirement model.

The constraint model includes <count>, <timed-count>, <datetime>, <interval>, <accumulated>, <individual>, <system>, <discrete>, <max-resolution>, <Device-NumThresh>, <execute-level> elements, etc.

Elements for securing confidentiality of a DRM content may be included in the security model. Particularly, a DRM content, which is included in the content object within a DCF, is encrypted using a content encryption key (CEK), and the CEK may be included in the rights object in an encrypted form by the REK. That is, the REK is a key used to encrypt items which need to be safely stored among items within the rights object as in CEK.

The REK may be delivered in an encrypted state using the public key (PuK) of the DRM agent in order to secure confidentiality during transmission from the rights issuer 20 to the DRM agent 11. Further, the REK may be managed and stored using the trusted storage 12 after the REK is decrypted using the private key (PrK) of the DRM agent.

Further, elements for securing integrity on correlation between a DRM content and rights objects may be included in the security model. For example, <digest> element may represent a DCF hash value for a DRM content referred to by <uid> element within the same <asset> element. To this end, the <digest> element may include <DigestMethod> element which indicate the hash algorithm and <DigestValue> element which indicate the hash value.

Further, the DRM agent 11 may use a separate data format in order to manage permissions and/or constraints given to related DRM content through the rights object. That is, the DRM agent 11 may manage the rights object using rights metadata, state information, etc. Further, the DRM agent 11 may preserve the rights object in the form of a rights object container for future use.

The rights metadata may be data including a rights object version, a rights object alias, an ID of a rights issuer (RI identifier), an address of the rights issuer (RI URL), and time information of the rights issuer (RI timestamp).

The state information refers to information indicating the current state of each stateful use right. The stateful use right is a use right where state information should be accurately maintained so that permissions and/or constraints may be accurately managed within the terminal. Some examples of the stateful use right managed through the state information are remaining counts, an interval, a start date, etc.

Likewise, various types of information on the rights object may be managed and stored using a trusted storage 12.

Rights Object Acquisition Protocol

Figure 4:
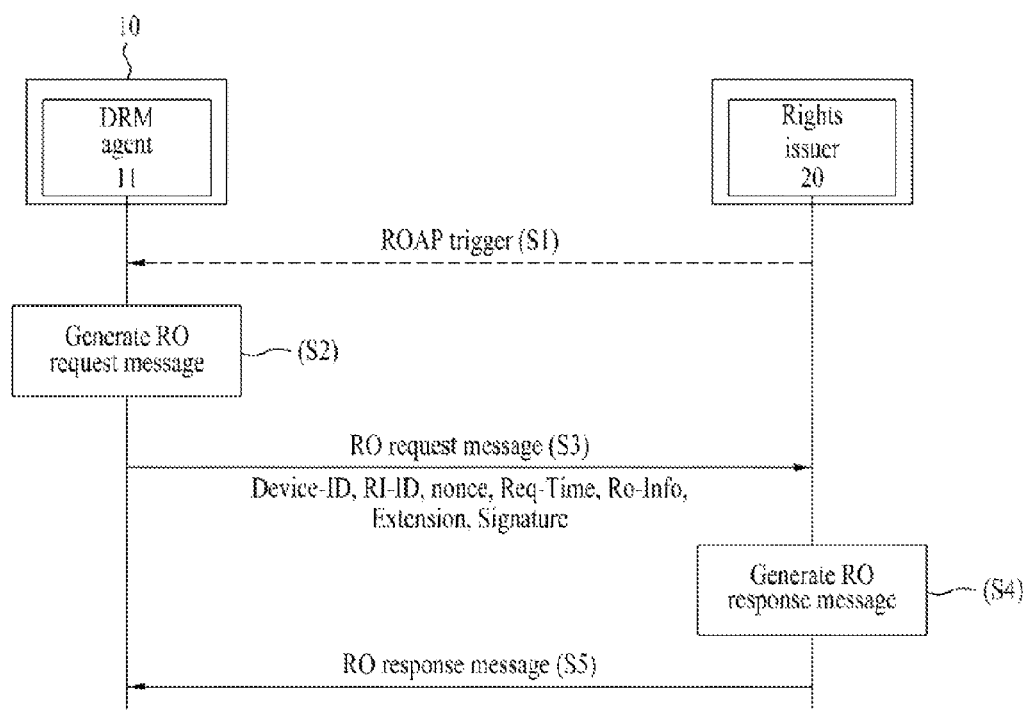
FIG. 4 is a flowchart illustrating a rights object acquisition protocol (ROAP) which is applicable to embodiments disclosed in the present specification.

FIG. 4 is a flowchart illustrating a rights object acquisition protocol (ROAP) which is applicable to embodiments disclosed in the present specification.

First, the rights issuer 20 may transmit a trigger message, for example, a trigger message for acquiring a rights object or a ROAP trigger message, to the terminal 100 in order to provide a rights object (S1).

The trigger message may be transmitted when the rights issuer 20 requests transmission of a rights object on a specific content through a method like a web browsing from a user. When such transmission is requested, IMSI and information on a terminal 10, e.g., a device ID, may be transmitted to the rights issuer 20. The trigger message may be formed in a form as shown in Table 3 below.

TABLE 3

```
<complexType name="ROAcquisitonTrigger">
    <complexContent>
        <extension base="roap: Basic RoapTrigger">
            <sequence>
                <element name="domainID"
                    type="roap:Domainidentifier" minOccurs="0"/>
                <element name="domainAlias" type="string"
```

TABLE 3-continued

```
              minOccurs="0"/>
              <sequence maxOccurs="unbounded">
              <element name="roID" type="ID"/>
              <element name="roAlias"type="roap:String80"
              minOccurs="0"/>
              <element name="contentID" type="anyURI"
              minOccurs="0" maxOccurs="unbounded"/>
        </sequence>
            </sequence>
                </extension>
          </complexContent>
</complexType>
```

Further, if the transmission request is received, the rights issuer 20 may generate a rights object for the specific content. Further, generation of the rights object may be performed after receiving a rights object request message from the terminal 10.

Next, if the trigger message is received, the DRM agent 11 of the terminal 10 generates a rights object request message to request the rights object to the rights issuer 20 (S2). The rights object request message includes the ID of the terminal. Further, the rights object request message includes the ID of the rights issuer, a device nonce, request time, RO information and extension parameter. Further, the rights object request message includes a signature.

The rights object request message including the signature requires integrity. To this end, the rights object request message includes an HMAC value. The HMAC value guarantees that the rights object request message has not been changed during transmission.

Next, the DRM agent 11 transmits the rights object request message to the rights issuer 20 (S3).

The rights issuer 20 generates a rights object response message (S4).

Thereafter, the rights object issuer 20 transmits the rights object response message to the DRM agent 11 (S5). Here, the rights issuer 20 includes a previously generated or currently generated rights object in the rights object response message in the form of a protected rights object.

The signature of the rights issuer 20 is included in the rights object response message. The rights object request message and the rights object response message follow DRM 2.0 protocol or DRM 2.1 protocol.

Constraints for Advertisement Content Management

Hereinafter, it is disclosed how a DRM system according to the embodiments of the present invention correlates an advertisement content with a non-advertisement content, and manages the advertisement content correlated with the non-advertisement content.

An advertisement content may be considered the same as a DRM content, but an additional control method is necessary to provide a function that makes consumer consume an advertisement before consuming a DRM content. Such a correlation between advertisement content and non-advertisement content may be implemented through a rights object and a DRM content.

Figure 5:
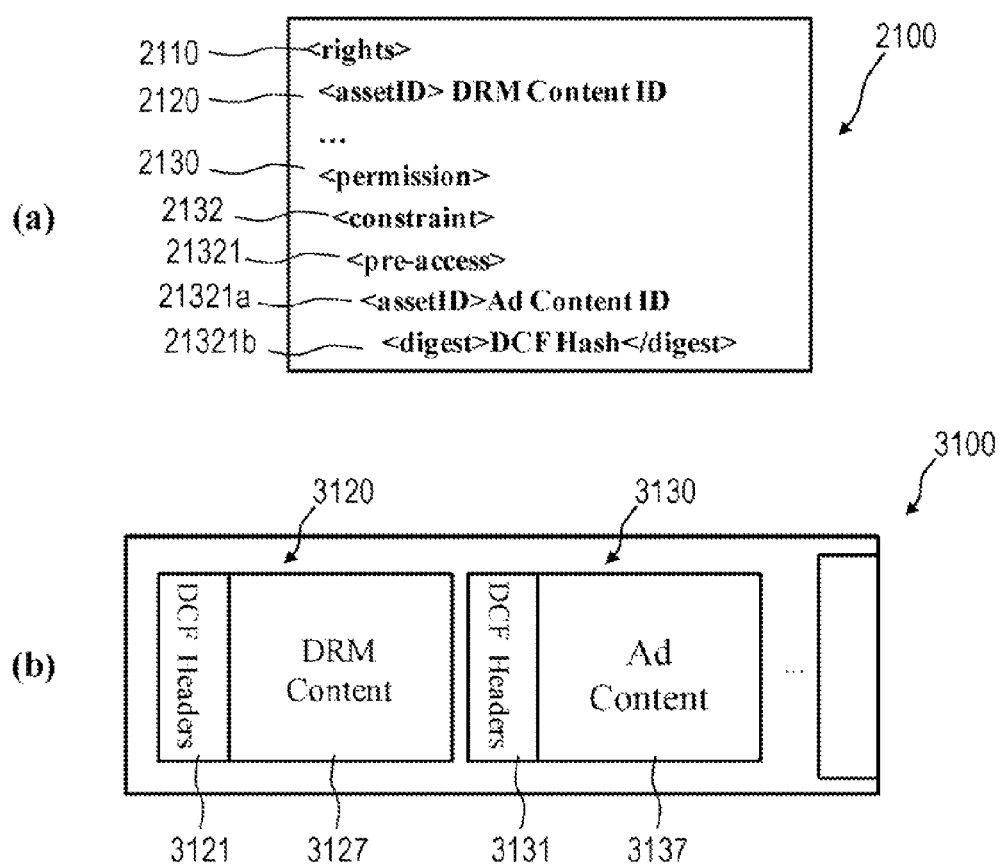
FIG. 5(a) is a view illustrating a rights object which is applicable to embodiments disclosed in the present specification.
FIG. 5(b) is a view illustrating a multi part DCF including an advertisement content connected with the rights object.
Figure 6:
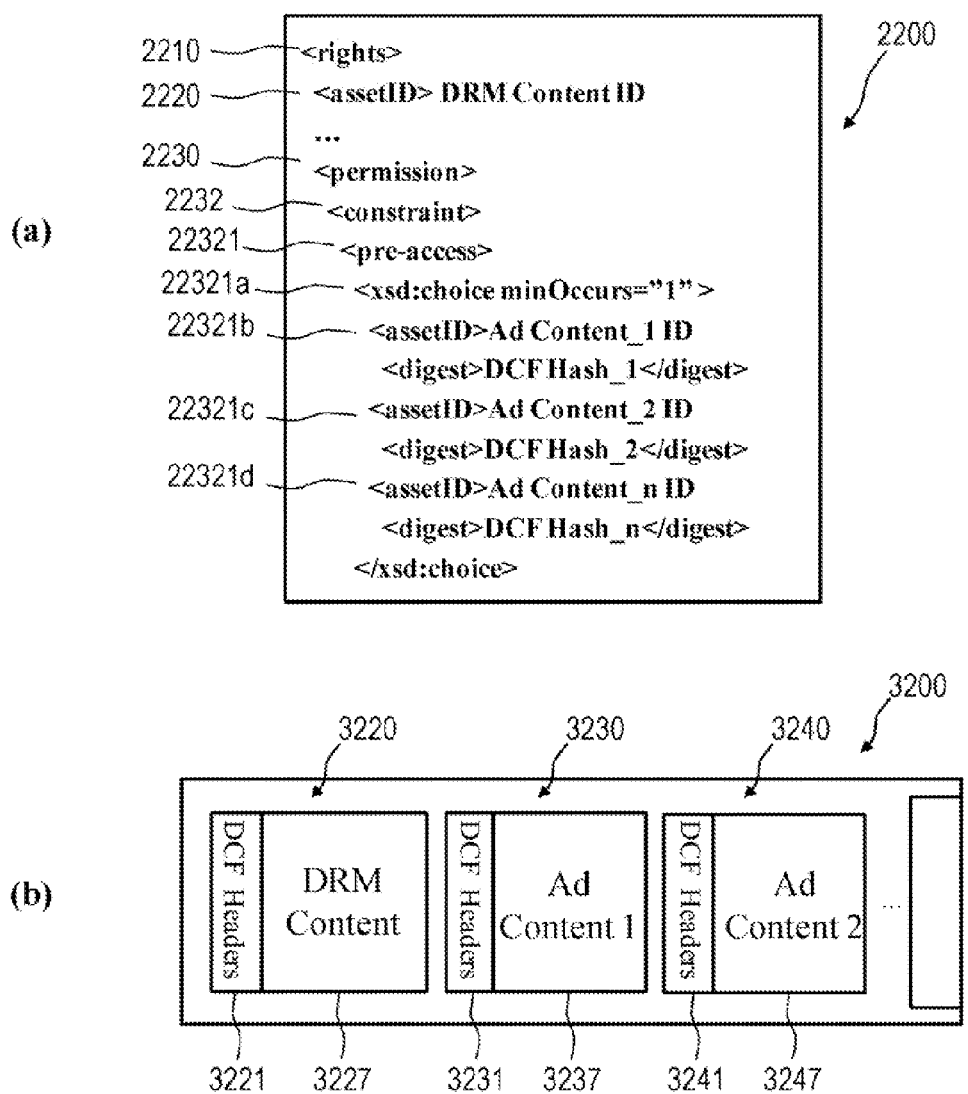
FIG. 6(a) is a view illustrating a rights object which is applicable to embodiments disclosed in the present specification.
FIG. 6(b) is a view illustrating a multi part DCF connected with the rights object.

Specifically, FIGS. 5 and 6 illustrate how the correlation, which shows that the advertisement content is consumed prior to the consumption of the non-advertisement content, is expressed within the rights object.

FIG. 5 illustrates a rights object which is applicable to embodiments of the present invention, and a multipart DCF including an advertisement content related with the rights object. FIG. 5(a) illustrates a rights object 2100, and FIG. 5(b) illustrates a DCF 2100 related to the rights object 2100. In particular, the DCF 3100 is a form of a multipart DCF, and includes a DRM container 3120 including a non-advertisement content 3127 and a DRM container 3130 including an advertisement content 3137.

Referring to FIG. 5, the rights object 2100 includes <rights> element 2110 corresponding to the foundation model. The element of the context model (not shown), which represents the identifier of the rights object 2100, may be included in the lower side of the <rights> element 2110. Further, <asset> elements indicating identification information of a DRM content included in the DCF and <agreement> elements (not shown) including <permission> and <constraint> elements indicating permissions and constraints related with the DRM content, may be included under the <rights> element 2110.

That is, <assetID> element 2120 under the <agreement> element (not shown) represents the identifier of a DRM content 3127, which is a non-advertisement content included in the DCF 3100, and <permission> element 2130 and <constraint> element 2132 under the <permission> element 2130 indicate permissions and/or constraints related with the DRM content 3127. The identifier of the DRM content 3127 may be included in the DCF header 3121 within the DRM container 3120.

The rights object 2100 includes elements 21321, 21321*a* and 21321*b* of the requirement model indicating the requirement of consumption prior to the consumption of the DRM content 3127. That is, <pre-access> element 21321, which is an element of the requirement model, indicates that the DRM content 3137, an advertisement content indicated by <assetID> element 21321*a*, should be consumed first.

Likewise, the advertisement content 3137 may be transmitted to the DRM agent 11 in the form of a multipart DCF 3100. The advertisement content 3137 may be included in the multipart DCF 3100 as plain text or in an encrypted state. If the advertisement content 3137 is encrypted and then included in the DCF 3100, a separate rights object (not shown) for decrypting the advertisement content 3137 may be necessary.

FIG. 6 illustrates a relation between a multipart DCF and a rights object which may be applied to the embodiments of the present invention.

FIG. 6(a) illustrates a rights object 2200, and FIG. 6(b) illustrates a multipart DCF 3200 related with the rights object 2200. In particular, the multipart DCF 3200 includes a DRM container 3220 including a non-advertisement content 3227 and DRM containers 3230 and 3240 respectively including advertisement contents 3237, 3247, etc.

In particular, in FIG. 6(a), the rights object 2200 includes permissions and constraints which stipulate selection and consumption of one of a plurality of advertisement contents 3237 and 3247, etc. included in the multipart DCF 3200 of FIG. 6(b).

Referring to FIG. 6, the rights object 2200 includes <rights> element 2210 corresponding to the foundation model. The element (not shown) of the context model, which indicates the identifier of the rights object 2200, may be included under the <rights> element 2210. Further, <asset> elements indicating identification information on a DRM content included in the DCF and <agreement> elements (not shown) including <permission> and <constraint> elements indicating permissions and constraints related with the DRM content, may be included under the <rights> element 2110.

That is, <assetID> element 2220 under the <agreement> element (not shown) represents the identifier of a DRM content 3227, which is non-advertisement content included in the DCF 3200, and <permission> element 2230 and <constraint> element 2232 under the <permission> element 2230 indicate permissions and/or constraints related with the DRM content 3227. The identifier of the DRM content 3227 may be included in the DCF header 3221 within the DRM container 3220.

The rights object 2200 includes elements 22321, 22321a and 22321b of the requirement model indicating requirement of consumption prior to consumption of the DRM content 3227.

That is, <pre-access> element 22321, which is an element of the requirement model, indicates that one of DRM contents 3237, 3247, etc., advertisement content indicated by <assetID> elements 22321b, 22321c, 22321d, etc. should be consumed first.

Likewise, the advertisement contents 3237, 3247, etc. may be transmitted to the DRM agent 11 in the form of a multipart DCF 3200. The advertisement contents 3237, 3247, etc. may be included in the multipart DCF 3200 as plain text or in an encrypted state. In case the advertisement contents 3237, 3247, etc. are encrypted and are then included in the DCF 3200, a separate rights object (not shown) for decrypting the advertisement contents 3237, 3247, etc. may be necessary.

Advertisement Content Management Using DRM

Figure 7:
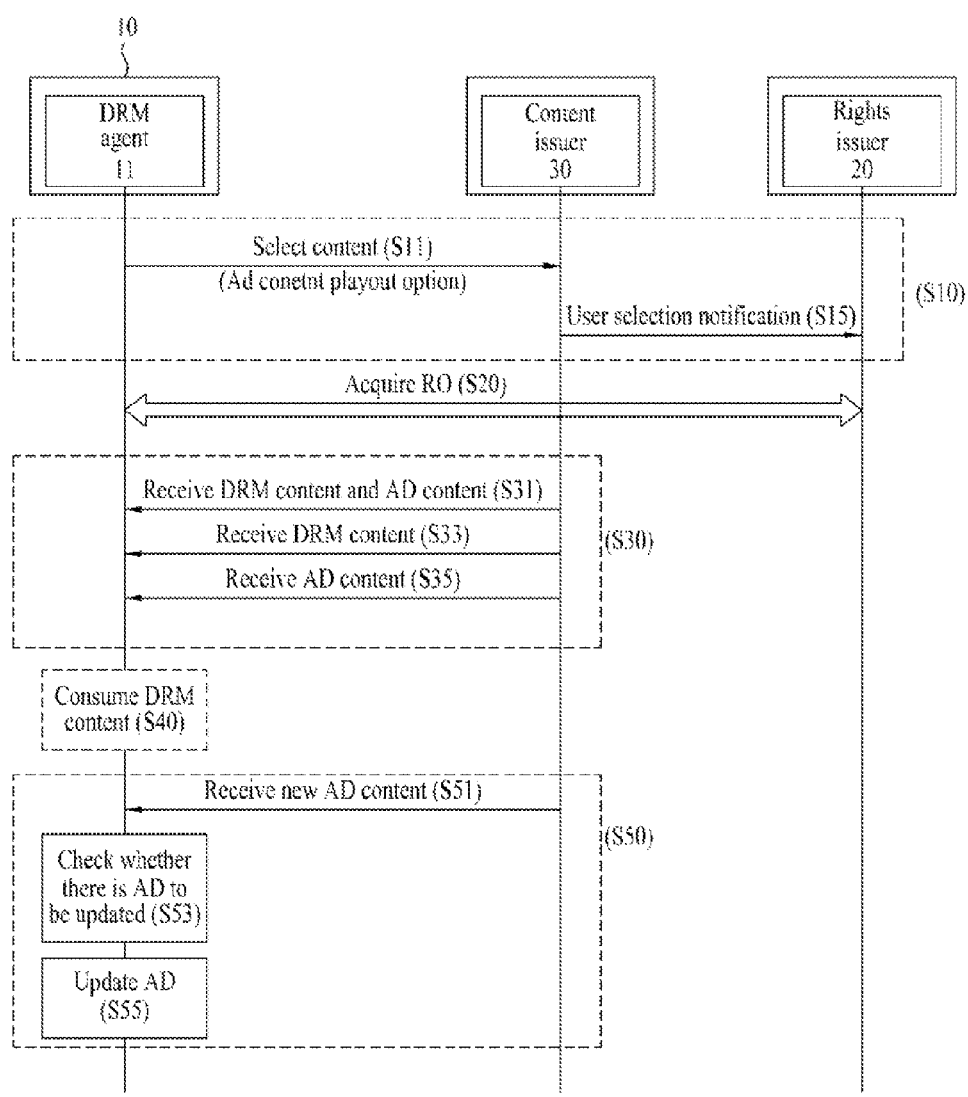
FIG. 7 is a view illustrating an advertisement content update method which is applicable to embodiments disclosed in the present specification.

FIG. 7 illustrates a method of managing advertisement content which can be used in the embodiments of the present invention. Hereinafter, a method of distributing, consuming and updating an advertisement content will be described with reference to FIG. 7.

1) Referring to FIG. 7, first, the terminal 10 selects a DRM content (a non-advertisement content), and selects consumption of an advertisement content for the sake of the DRM content (S10).

Specifically, the terminal 10 connects the content issuer (CI) 30, and searches for and selects the DRM content (S11).

At this time, the terminal 10 may select an option that advertisement content should be consumed (i.e., played out or displayed out) prior to consumption of the searched DRM content.

Further, the terminal 10 may authorize the advertisement provider (not shown) to update the advertisement content. Thereafter, the content issuer 30 notifies the rights issuer 20 of the selection of the terminal 10 (S15).

2) Thereafter, in order to consume the DRM content, the DRM agent 11 of the terminal 10 requests a necessary rights object to the rights issuer 20, and acquires the requested rights object (S20). The process of requesting the rights object is performed by the rights object acquisition protocol (S1 to S5) illustrated with reference to FIG. 3.

That is, the DRM agent 11 transmits the rights object request message to the rights issuer 20, and acquires a necessary rights object by receiving a rights object response message including a rights object in response thereto.

Here, as stated above, the rights object is generated to include permissions and constraints stipulated to play out an advertisement content prior to the consumption of the DRM content based on selection of the terminal 10 by the rights issuer 20. For example, the rights object may include permissions and constraints such as an enforced playout of the advertisement content, the number of advertisement content that should be played out, playout rules, the identifier of a specific advertisement content that should be played out, etc.

3) Thereafter, the DRM agent 11 receives the DRM content and the advertisement content (S30).

The reception of the DRM content and the advertisement content may be performed according to various methods. The DRM content is included in a DCF, and is then received.

Hence, the DRM agent 11 may be received in a manner that includes the advertisement content in the DCF including the selected content (S31), or a DCF including only the above content may be received (S33) and a DCF including the advertisement content may be separately received (S35).

Further, it is possible to receive a DCF including instructions on how the advertisement content should be forcibly played out.

4) Thereafter, the DRM agent 11 consumes the DRM content according to permissions and constraints expressed in the rights object (S40).

Specifically, as explained with reference to FIG. 5, the DRM agent 11 analyzes the rights object which expresses the correlation between the advertisement content and the DRM content. The DRM agent 11 may consume the advertisement content first and then the DRM content according to the result of the analysis.

To this end, though not illustrated, the DRM agent 11 may receive a separate rights object for the advertisement content, and consume the advertisement content according to permissions and constraints stipulated in the received separate rights object.

5) Thereafter, the DRM agent 11 performs a procedure for updating the advertisement content (S50). The procedure of updating the advertisement content is substituting the already received advertisement content with a newly received advertisement content.

Specifically, the DRM agent 11 receives a new advertisement content (S51). The advertisement content may be updated by the content issuer 30 or according to the request of the DRM agent 11.

Hence, the process of receiving the new advertisement content may be performed by a method of receiving a DCF including the new advertisement content by the request of the DRM agent 11, by a method of receiving the new advertisement content pushed by the content issuer 30, or by a method of receiving the new advertisement content, by the DRM agent 11, as the conditions of device management by scheduling are satisfied.

Thereafter, the DRM agent 11 performs a process of determining whether there is an advertisement content to be updated by comparing the already received advertisement content with the new advertisement content (S53), and in case there is a content to be updated as a result of the determination, the DRM agent 11 substitutes the already received advertisement with the new advertisement content (S55).

Advertisement Content Update-First Exemplary Embodiment and Modified Embodiment

Figure 8:
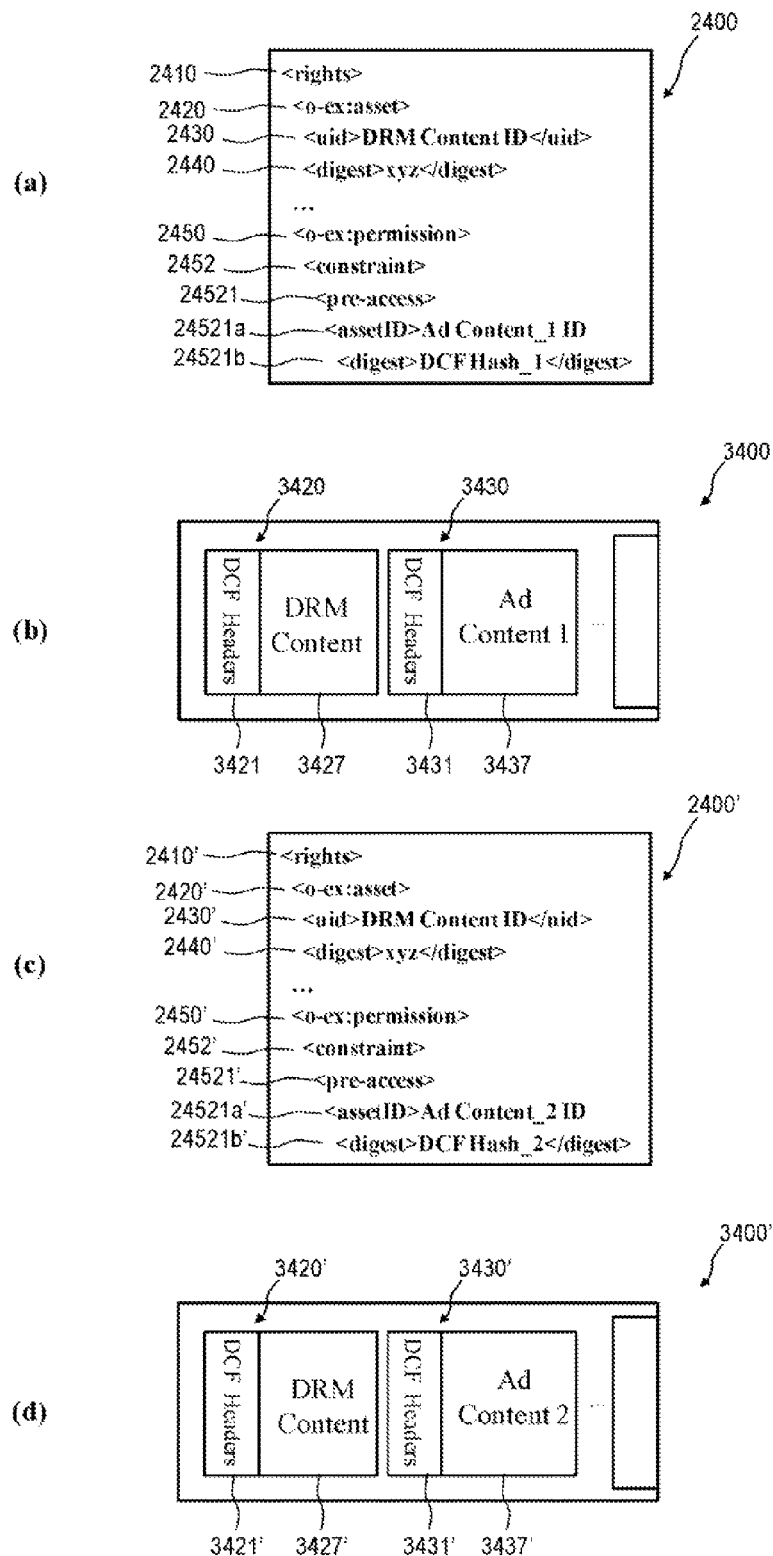
FIGS. 8(a) to 8(d) are views illustrating a relation between a rights object and a DCF used in a first embodiment of the advertisement content update method illustrated in FIG. 7.

FIG. 8 illustrates an advertisement content update method according to a first embodiment of the present invention. A method for updating the already received advertisement content to a new advertisement content by the DRM agent 11 will be described with reference to FIG. 8.

First, it is assumed that, as a result of the previous steps (S10 to S40 of FIG. 7) of the process of updating an advertisement content, the DRM agent 11 has already received a multipart DCF 3400 and stored the multipart DCF 3400 in the storage 12, and has received a rights object 2400 related with the DRM content 3427 included in the multipart DCF 3400 and stored the rights object 2400 in the storage 12.

Referring to FIG. 8(a), the already received rights object 2400 includes a <rights> element 2410 corresponding to the foundation model. The rights object 2400 may include the element (not shown) of the context model indicating the identifier of the rights object 2400 under the <rights> element 2410. Further, the rights object 2400 may include <asset> elements indicating identification information on the DRM content included in the DCF, and <agreement> element (not shown) including <permission> and <constraint> elements indicating permissions and constraints related with the DRM content under the <rights> element 2410.

That is, <o-ex:asset> element 2420 under the <agreement> element (not shown) indicates the identifier of the DRM content 3427 which is a non-advertisement content included in the DCF 3400, and <o-ex:permission> element 2450 indicates permissions and/or constraints related with the DRM content 3427 along with the sub <constraint> element 2452. The identifier of the DRM content 3427 may be included in the DCF header 3421 within the DRM container 3420.

The rights object 2400 includes elements 24521, 24521a and 24521b of a requirement model indicating consumption requirement prior to the consumption of the DRM content 3427. That is, <pre-access> element 24521, which is an element of requirement model, indicates that the DRM content 3437, which is an advertisement content indicated by the <assetID> element 24521a, should be consumed first. Further, the rights object 2400 includes <digest> element 24521b including the hash value of the DCF for integrity protection of the DCF 3400. Since the DCF hash value is changed in the following advertisement content update process in the above first embodiment, the value of <digest> element 24521b within the rights object 2400 should also be changed to another value.

The method for updating a advertisement content by the DRM agent 11 according to the first embodiment (S50) is described below.

First, the DRM agent 11 receives a new rights object 2400' and a new multipart DCF 3400' illustrated in FIGS. 8(c) and 8(d) (S51). The new rights object 2400' and the new multipart DCF 3400' may be received together or separately.

Thereafter, the DRM agent 11 checks whether there is an advertisement content to be updated in the storage 12 (S53). The check process may be performed by a method for determining whether the identifier of the DRM content 3427 within the already received multipart DCF 3400 is the same as that of the new multipart DCF 3400'.

As a result of the check, if the already received multipart DCF 3400 and the new multipart DCF 3400' have the same DRM content 3427, but have different advertisement contents 3437 and 3437', the DRM agent 11 updates the advertisement content (S55). If the identifiers are different, the DRM agent 11 ignores or discards the advertisement content.

Thereafter, in order for the DRM agent 11 to consume the DRM content 3427, the updated advertisement content 3437' should be enforcedly consumed according to permissions and constraints included in the new rights object 2400'.

In the below, a modified embodiment of the first embodiment will be described.

In order to check whether there is an advertisement content to be updated in the storage 12 (S53), the DRM agent 11 may determine whether the two rights objects 2400 and 2400' are related with the same DRM content, and whether there is an element about an advertisement content among elements of the requirement model within the two rights objects 2400 and 2400'.

As a result of the determination, if there are elements 24521 and 24524' indicating that advertisement content should be enforcedly consumed according to permissions and constraints about the same DRM content within the two rights objects 2400' and 2400', the DRM agent 11 substitutes the advertisement content 3437 stipulated in the already received rights object 2400 for the advertisement content 3437' stipulated in the new rights object (S55).

Other steps, which have not been modified in the modified embodiment of the first embodiment, may be performed in the same manner as in the first embodiment.

Figure 9:
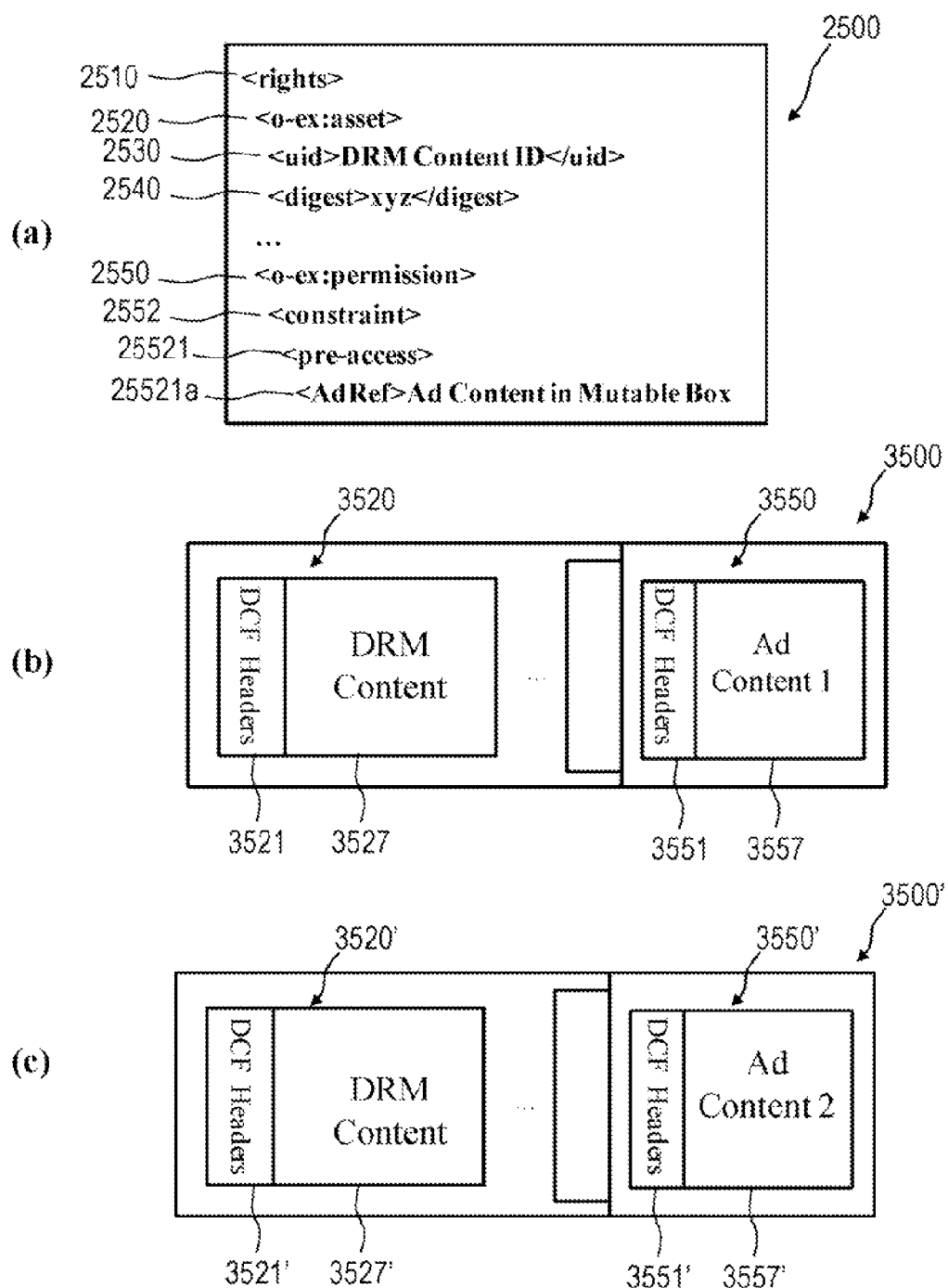
FIGS. 9(a) to 9(c) are views illustrating a second embodiment of an advertisement content update method illustrated in FIG. 7 and illustrating a relation between a rights object and a DCF used to update an advertisement content without updating a rights object.

Advertisement Content Update-Second Exemplary Embodiment and Modified Embodiment FIG. 9 illustrates an advertisement content update method according to a second embodiment of the present invention. A method for updating only the already received advertisement content to a new advertisement content without updating a rights object by the DRM agent 11 will be described with reference to FIG. 9.

First, it is assumed that, as a result of the previous steps (S10 to S40 of FIG. 7) of the process for updating an advertisement content, the DRM agent 11 has already received a DCF 3500 and stored the DCF 3500 in the storage 12, and has received a rights object 2500 related with the DRM content 3527 included in the DCF 3500 and stored the rights object 2500 in the storage 12.

Referring to FIG. 9(a), the already received rights object 2500 includes a <rights> element 2510 corresponding to the foundation model. The rights object 2500 may include the element (not shown) of the context model indicating the identifier of the rights object 2500 under the <rights> element 2510. Further, the rights object 2500 may include <asset> elements indicating identification information on the DRM content included in the DCF, and <agreement> element (not shown) including <permission> and <constraint> elements indicating permissions and constraints related with the DRM content under the <rights> element 2510.

That is, <o-ex:asset> element 2520 under the <agreement> element (not shown) indicates the identifier of the DRM content 3527, which is a non-advertisement content included in the DCF 3500, and <o-ex:permission> element 2550 indicates permissions and/or constraints related to the DRM content 3527 along with the sub <constraint> element 2552. The identifier of the DRM content 3527 may be included in the DCF header 3521 within the DRM container 3520.

The rights object 2500 includes elements 25521 and 25521a of the requirement model indicating consumption requirement prior to consumption of the DRM content 3527. That is, <pre-access> element 25521, which is an element of requirement model, indicates that the DRM content 3557, which is an advertisement content referred to by <AdRef> element 25521a, should be consumed first.

A method for updating a advertisement content by the DRM agent according to the second embodiment is described below (S50).

First, the DRM agent 11 receives a new DCF 3500' illustrated in FIG. 9(c) (S51). The new DCF 3500' includes identifiers of a new advertisement content 3557' and an advertisement content to be updated. Further, the DRM content 3527' included in the new DCF 3500' may be configured to be the same as the DRM content 3527 included in the previously received DCF 3500.

Thereafter, the DRM agent 11 checks whether there is an advertisement content to be updated in the storage 12 (S53). The check process may be performed by a method for checking whether there is a advertisement content matched with the identifier of the to-be-updated advertisement content included in the new DCF 3500' in the storage 12. That is, the identifier of the to-be-updated advertisement content indicates that the new advertisement content 3557' is used for the update of the to-be-updated advertisement content 3557.

As a result of the check, if there is an advertisement content corresponding to the identifier of the to-be-updated advertisement content in the storage 12, the update process is performed by substituting the to-be-updated content 3557 with the new advertisement content 3557' (S55).

Thereafter, in order for the DRM agent 11 to consume the DRM content 3527', the updated advertisement content 3527' should be enforcedly consumed according to permissions and constraints included in the rights object 2500.

According to the method for updating an advertisement according to the second embodiment, even if the new DCF 3500' is received, the DRM contents 3527 and 3527' are not changed, and thus the rights object 2500 related with the DRM contents 3527 and 3527' does not need to be newly received.

Referring to FIGS. 9(b) and 9(c), the advertisement contents 3557 and 3557' may be included in the mutable DRM information boxes 3550 and 3550' of the DCFs 3500 and 3500', respectively. Hence, a new advertisement content 3557' may be included in the mutable DRM information box 3550' of the new DCF 3500'.

Since the mutable DRM information boxes 3550 and 3550' are disregarded in the DCF hash calculation in the second embodiment, the hash value of the DCF does not need to be maintained in the element of the requirement model within the rights object 2500 unlike other embodiments.

Further, the identifier of the advertisement to be updated may be included in the DRM container including the DRM content 3527' of the new DCF 3500'. Specifically, the identifier of the advertisement content to be updated may be expressed as "OldContentID" field, and may be included in the DCF header 3521' of the DRM container. More specifically, the "OldContentID" field, which is the identifier of the advertisement content to be updated, may be included in the ExtendedHeaders field within the common header of the DCF header 3521'.

The "OldContentID" field may comprise ContentID field indicating the identifier of the advertisement content to be updated, and ContentIDLength field indicating the length of the ContentID field.

Hereinafter, a modified embodiment of the second embodiment will be described.

The new DCF 3500' may be a DCF including only the mutable DRM information box 3550', which includes the new advertisement content 3557', without including a DRM content. The modified embodiment of the second embodiment is similar to the case in which the DRM content 3527' included in the new DCF 3500' is configured to be the same as the DRM content 3527 included in the previously received DCF 3500. That is, according to the second embodiment, the DRM content 3527 is not changed, and thus other steps may be performed in the same manner as in the second embodiment.

Advertisement Content Update-Third Exemplary Embodiment and Modified Embodiment

Figure 10:
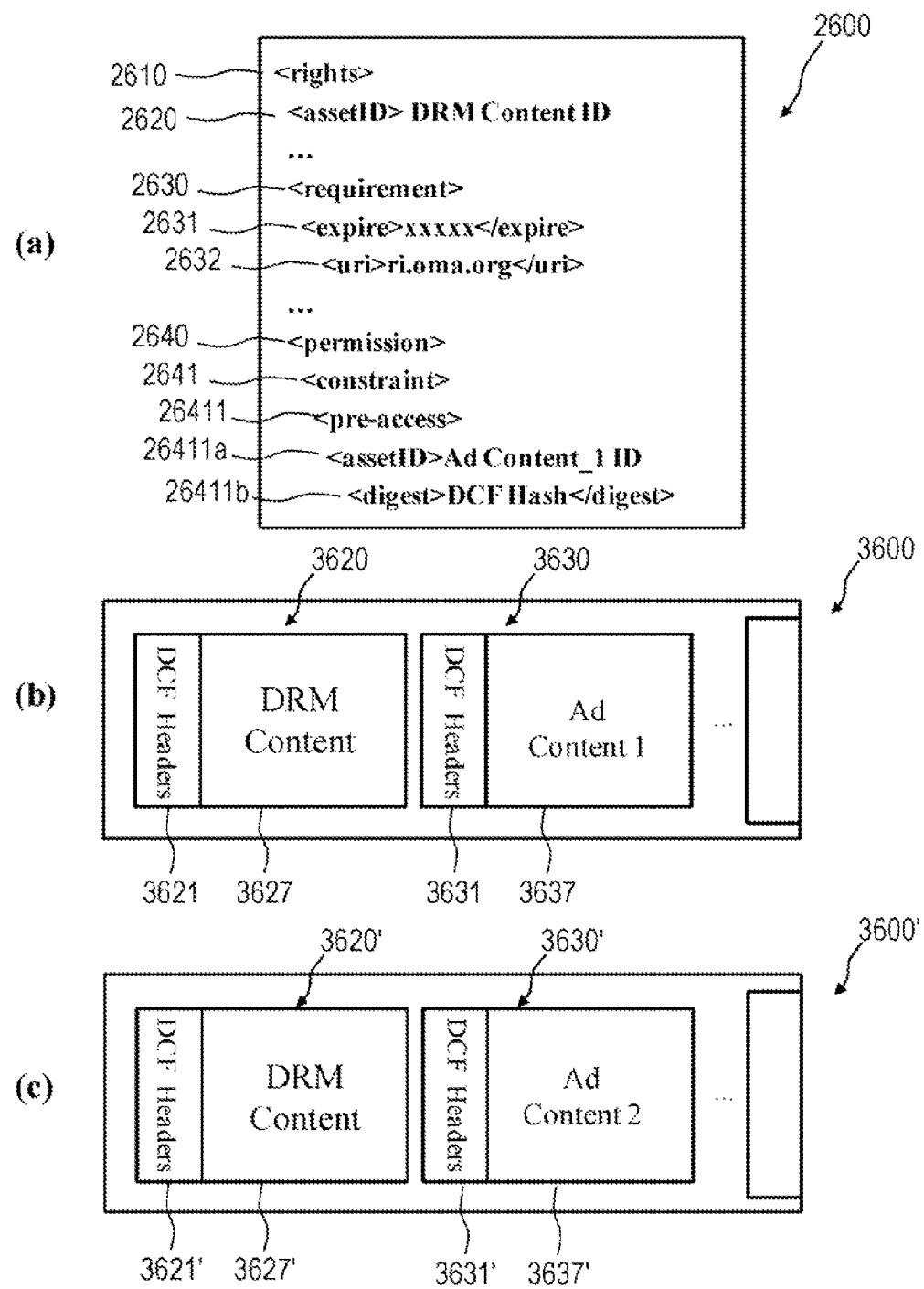
FIGS. 10(a) to 10(c) are views illustrating a relation between a rights object and a DCF used in a third embodiment of an advertisement content update method illustrated in FIG. 7.

FIG. 10 illustrates a method for updating a advertisement content according to a third embodiment of the present invention. A method for updating only already received advertisement contents to a new advertisement content without updating a rights object by the DRM agent 11 will be described with reference to FIG. 10.

First, it is assumed that, as a result of the previous steps (S10 to S40 of FIG. 7) of the process for updating advertisement content, the DRM agent 11 has already received a multipart DCF 3600 and stored the multipart DCF 3600 in the storage 12, and has received a rights object 2600 related with the DRM content 3627 included in the multipart DCF 3600 and stored the rights object 2600 in the storage 12.

Referring to FIG. 10(a), the already received rights object 2600 includes a <rights> element 2610 corresponding to the foundation model. The rights object 2600 may include the element (not shown) of the context model indicating the identifier of the rights object 2600 under the <rights> element 2610. Further, the rights object 2600 may include <asset> elements indicating identification information on the DRM content included in the DCF, and <agreement> element (not shown) including <permission> and <constraint> elements indicating permissions and constraints related with the DRM content under the <rights> element 2610.

That is, the <asset> element 2620 under the <agreement> element (not shown) represents the identifier of the DRM content 3627, which is a non-advertisement content included in the multipart DCF 3600, the <requirement> element 2630 represents the enforced advertising rule, and the <permission> element 2640 and the sub <constraint> element 2641 represent permissions and/or constraints related with the DRM content 3627. The identifier of the DRM content 3627 may be included in the DCF header 3621 within the DRM container 3620. There are the <expire> element 2631 indicating the expired period of the DRM content 3627 according to the enforced advertisement consumption rule, and the <uri> element 2632 indicating the address of the server which may be connected for continuous use under the <requirement> element 2630.

The rights object 2600 includes elements 26411, 26411a and 26411b of the requirement model indicating consumption requirement prior to the consumption of the DRM content 3627. That is, the <pre-access> element 26411, which is an element of the requirement model, indicates that the DRM content 3637, which is the advertisement content indicated by the <assetID> element 26411a, should be consumed first. Further, the rights object 2600 includes <digest> element 26411b including the hash value of the DCF for the integrity protection of the DCF 3600. In the third embodiment, the DCF hash value is changed in the following advertisement content update process, and thus the value of the <digest> element 26411b, which includes the DCF hash value, within the rights object 2600 should also be changed to another value.

The method (S50) for updating an advertisement content by the DRM agent 11 according to the third embodiment is described below. The following process for updating an advertisement content may be performed in case the period indicated by the sub <expire> element 2631 of the <requirement> element 2630 is expired.

First, the DRM agent 11 receives a new DCF 3600' illustrated in FIG. 10(c) (S51). The new DCF 3600' includes the identifiers of a new advertisement content 3637' and an advertisement content to be updated. Further, the DRM content 3627' included in the new DCF 3600' may be configured to be the same as the DRM content 3627 included in the previously received DCF 3600.

Thereafter, the DRM agent 11 checks whether there is a advertisement content to be updated in the storage 12 (S53). The check process may be performed by a method for checking whether an advertisement content corresponding to the identifier of the to-be-updated advertisement content included in the new DCF 3600' exists in the storage 12.

As a result of the check, if there is an advertisement content corresponding to the identifier of the to-be-updated advertisement content in the storage 12, the update process is performed by substituting the to-be-updated advertisement content 3637 with the new advertisement content 3637' (S55).

Thereafter, in order for the DRM agent 11 to consume the DRM content 3627', the new rights object (not shown) should be received, and the updated advertisement content 3557' should be enforcedly consumed according to the permissions and constraints included in the received rights object.

Hereinafter, a modified embodiment of the third embodiment will be described.

The new DCF 3600' may be a DCF in the form of including only a DRM container, which includes an advertisement content, not a form of a multipart DCF. The modified embodiment of the third embodiment is similar to the case in which the DRM content 3627' included in the new DCF 3600' is configured to be the same as the DRM content 3627 included in the previously received DCF 3600 in the third embodiment. That is, according to the third embodiment, the DRM content 3627 is not changed, and thus other steps may be performed in the same manner as that of the third embodiment.

Reflecting Result of Consumption of Advertisement Content-Fourth Embodiment

Figure 11:
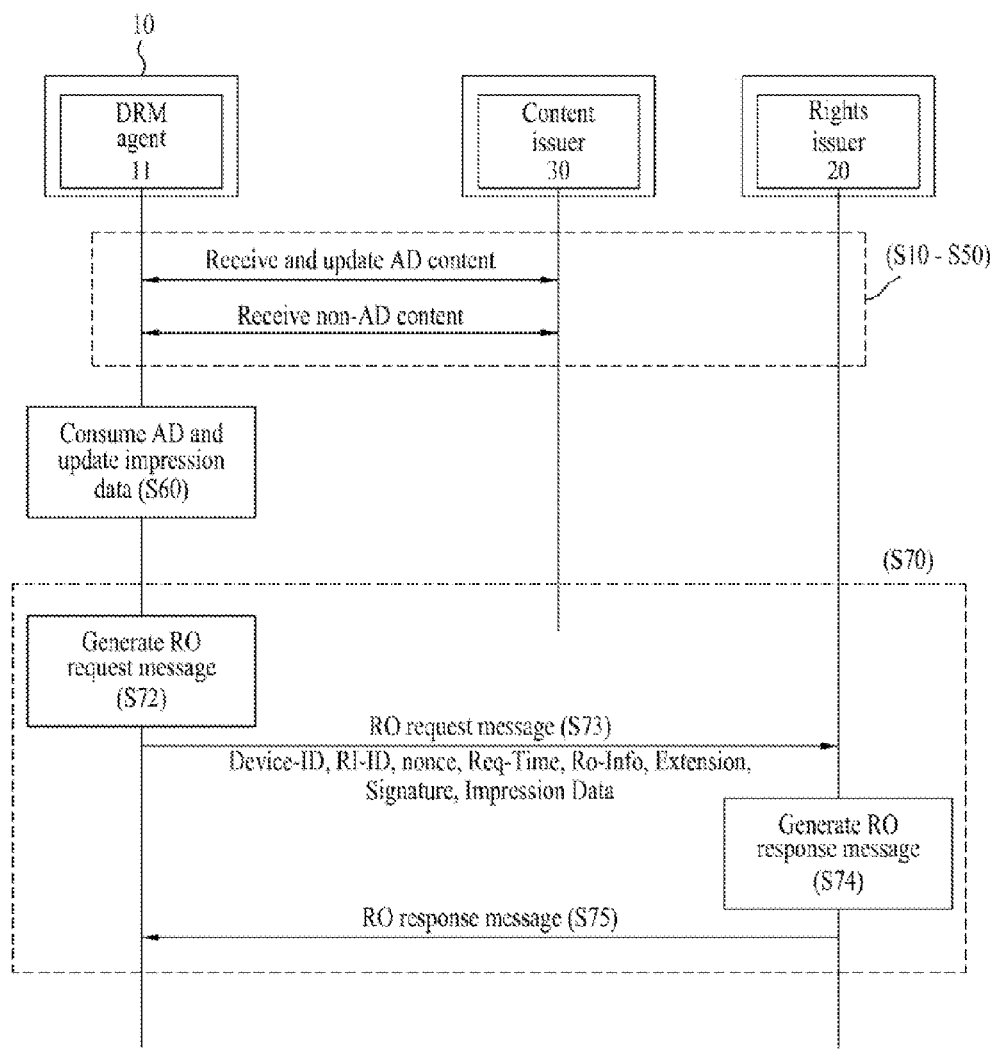
FIG. 11 is a flowchart illustrating a method for acquiring a rights object by reflecting a consumption result of an advertisement content according to a fourth embodiment of a technology disclosed in the present specification which is applicable to embodiments illustrated in FIGS. 7 to 10.

FIG. 11 is a fourth embodiment of the present invention, and is a flowchart illustrating acquisition of a rights object by reflecting the result of consumption of an advertisement content.

The fourth embodiment relates to consuming a non-advertisement content by the DRM agent 11 after an advertisement content is updated by the previous embodiments. That is, the fourth embodiment relates to a method for giving an advantage to consumption of the non-advertisement content based on the consumption of the advertisement content when trying to obtain a rights object for the non-advertisement content if the DRM agent consumes each updated advertisement content.

To this end, the DRM agent 11 updates impression data in the case of consuming an advertisement content. The impression data corresponds to information notifying of the completion of consumption of the advertisement content by the user of the terminal 10. The fourth embodiment may be performed through a protocol for acquiring the rights object using the impression data.

The impression data should be stored within the DRM agent 11, i.e., within the secure storage 12, and should be updated when the DRM agent 11 plays out the advertisement content.

In case the DRM agent 11 downloads a DRM content with a payment option related with the playout information of the advertisement content, the DRM agent 11 may request to the rights issuer 20 the permission for the DRM content using the impression data.

Hereinafter, the method for acquiring a rights object according to the fourth embodiment will be described with reference to FIG. 11.

1) First, the DRM agent 11 receives an advertisement content and a DRM content (a non-advertisement content) according to the above-described embodiments (S10 to S50). That is, the DRM agent 11 may receive the advertisement content and update the advertisement content to a new advertisement content according to the above-described embodiments.

Further, the rights object for the DRM content may be received through the ROAP illustrated with reference to FIG. 4. However, in the following steps, the process for obtaining a new rights object related with the DRM content, based on the consumption result of the advertisement content, may be continued.

2) Next, the DRM agent 11 consumes the advertisement content, and updates the impression data based on the result of the consumption (S60).

The impression data may be a specific formatted data as shown in Table 4 below. Such an impression data format may be the same as rawMeteringReportData format.

TABLE 4 rawMeteringReportData = *(CRLF perContentMeteringInformation) *( CRLF per A d ContentMeteringInformation) [CRLF]
perContentMeteringInformation= (contentID %d58 1*5(permission %d58 consumptionCount %d58 accumulatedConsumptionTime)
per AdContentMeteringInformation= (adverismentID %d58 1*5(AdRequirement %d58 consumptionCount %d58 accumulatedConsumptionTime)
permission = play / display / exucute / print / export
contentID = *(VCHAR)
consumptionCount=*(DIGIT)
accumulatedConsumptionTime=*(DIGIT) %d58 seconds
seconds=%x30-25 %x30-39
AdRequirement = playout / displayout / executeout
advertisementID = *(VCHAR)

3) Next, the DRM agent 11 acquires a rights object for the DRM content from the rights issuer 20 based on the impression data (S70). The method for acquiring a rights object based on the impression data is different from the method for acquiring a rights object illustrated with reference to FIG. 4.

Specifically, the DRM agent 11 generates a rights object request message in order to request the rights object (RO) to the rights issuer 20 (S72). At this time, the rights object request message includes the ID of the terminal, the ID of the rights issuer, a device nonce, requested time, RO information, and an extension parameter as well as the impression data. Further, the rights object request message includes a signature.

The impression data within the rights object request message may be displayed as shown below.

TABLE 5

<complexType name= "Advertisement Impression Data">
    <complexContent>
        <extension base= "roap:Extension">
            <sequence maxOccurs=" unbounded">
                <choice>
                    <element name="roap:rawMeteringReportData"
                    type="string"/>

TABLE 5-continued

```
        </element>
      </choice>
    </sequence>
  </extension>
 </complexContent>
</complexType>
```

Next, the DRM agent 11 transmits the rights object request message to the rights issuer 20 (S73).

Next, the rights issuer 20 generates a rights object response message (S74). Thereafter, the rights issuer 20 transmits the rights object response message, for example, RO Response message to the DRM agent 11 (S75).

In case the impression data is sufficient to issue the permission for the DRM content, the rights issuer 20 may issue the permission based on the impression data and the policy of the rights issuer 20. In case the impression data is not sufficient to issue the permission for the DRM content, the rights issuer 20 should transmit an RO response message along with an error code.

Specifically, a UnableToDecryptAdvertisementImpressionData response message is a response message transmitted in case the rights issuer fails to decrypt the impression data, and a InsufficientAdvertisementImpressionData response message is a response message transmitted in case the impression data is insufficient.

Next, the DRM agent 11 may acquire a rights object, which reflects the impression data, from the RO response message received from the rights issuer 20, and may consume the DRM content.

Apparatus

Figure 12:
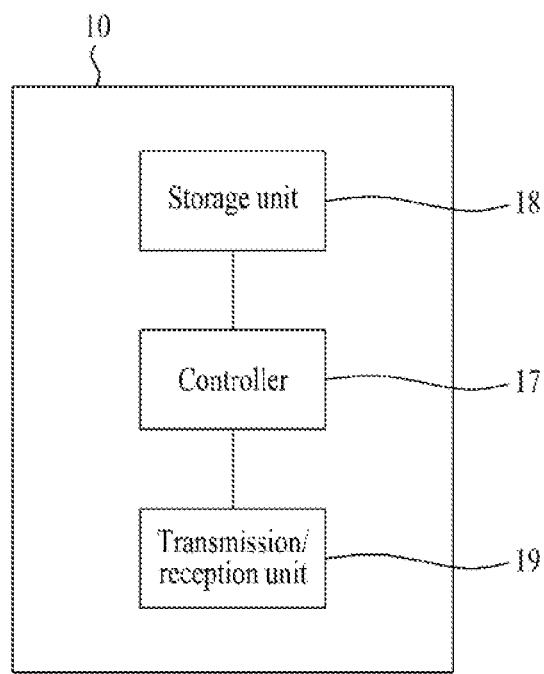
FIG. 12 is a view illustrating the constitution of an apparatus according to embodiments disclosed in the present specification.

FIG. 12 illustrates the configuration of an apparatus according to embodiments of the present invention.

Referring to FIG. 12, the terminal 10 includes a controller 17, a storage unit 18 and a transmission/reception unit 19.

The controller 17 is configured to be connected with the storage unit 18 and the transmission/reception unit 19, may execute the DRM agent, and may play out a non-advertisement content and an advertisement content. Here, the controller 17 may restrict the playout of the non-advertisement content and the advertisement content according to the rights object.

The storage unit 18 respectively stores a DRM agent, a non-advertisement content and an advertisement content, and a rights object for the content.

The transmission/reception unit 19 receives a non-advertisement and an advertisement content from the content issuer 30, and receives a rights object from the rights issuer 20.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

The invention claimed is:

1. A method for updating DRM (digital rights management) content using an rights object which a terminal has already received comprising:
    receiving, by the terminal from a server, a DRM content format (DCF) which includes a container including an extended header and a mutable information box including a new advertisement DRM content,
    wherein the extended header includes an identifier (ID) field indicating an old advertisement DRM content to be updated with the new advertisement DRM content,
    checking, by the terminal, whether the ID field matches an ID specified by an <AdRef> element of an <rights> element included in the rights object,
    wherein the rights object includes identification information about at least one DRM content, constraints and permissions associated with the at least one DRM content, and wherein the <rights> element indicates that the terminal has to consume a advertisement DRM content indicated by the <AdRef> element before a non-advertisement DRM content associated with the <rights> element is consumed;
    if the ID field matches the ID specified by the <AdRef> element, replacing the old existing advertisement DRM content with the new advertisement DRM content, and
    if the ID field does not match the ID specified by the <AdRef> element, discarding the new advertisement DRM content;
    wherein the new advertisement DRM content is encrypted with a content encryption key (CEK) which was used for the old advertisement DRM content.

2. The method according to claim 1, wherein the ID field is an old content identifier (ID) field.

3. The method according to claim 1, wherein the CEK is associated with the rights object.

4. The method according to claim 1, the method further comprising:
    transmitting, by the terminal, a rights object request message, wherein the rights object request message includes impression data on consumption of the new advertisement DRM content or the old advertisement DRM content to be updated; and
    receiving, by the terminal, a rights object response message including a rights object for the non-advertisement DRM content.

* * * * *